US005217204A

United States Patent [19]

Maier et al.

[11] Patent Number: 5,217,204

[45] Date of Patent: Jun. 8, 1993

[54] VALVE

[75] Inventors: Martin Maier, Moeglingen; Ferdinand Reiter, Markgroeningen, both of Fed. Rep. of Germany; Alwin Stegmaier; Kenneth Tanski, both of North Charleston, S.C.

[73] Assignee: Robert Bosch GmbH, Stuttgart, Fed. Rep. of Germany

[21] Appl. No.: 910,598

[22] Filed: Jul. 8, 1992

[30] Foreign Application Priority Data

Jul. 30, 1991 [DE] Fed. Rep. of Germany ....... 4125155

[51] Int. Cl.[5] ............ F16K 31/02

[52] U.S. Cl. ............ 251/337; 251/129.21; 123/472

[58] Field of Search ............ 251/337, 129.21; 123/472

[56] References Cited

U.S. PATENT DOCUMENTS

| | | | |
|---|---|---|---|
| 1,775,999 | 9/1929 | Haseloff . | |
| 2,289,310 | 7/1942 | Steel | 251/129.21 |
| 3,001,546 | 9/1961 | Salisbury | 251/337 |
| 3,647,177 | 7/1972 | Lang . | |
| 3,731,880 | 5/1973 | Williams . | |
| 3,800,825 | 4/1974 | Zoll | 251/337 |
| 4,984,744 | 1/1991 | Babitzka et al. | 251/129.21 |
| 5,104,091 | 4/1992 | Rathay et al. | 251/337 |

FOREIGN PATENT DOCUMENTS

| | | | |
|---|---|---|---|
| 86323 | 5/1895 | Fed. Rep. of Germany . | |
| 831629 | 2/1952 | Fed. Rep. of Germany . | |
| 1263396 | 3/1968 | Fed. Rep. of Germany . | |
| 3825135 | 1/1990 | Fed. Rep. of Germany | 123/472 |
| 3831196 | 3/1990 | Fed. Rep. of Germany . | |
| 4019072 | 12/1990 | Fed. Rep. of Germany . | |
| 4003227 | 1/1991 | Fed. Rep. of Germany . | |
| 2410183 | 6/1979 | France . | |
| 408541 | 9/1966 | Switzerland . | |
| 623641 | 6/1981 | Switzerland . | |
| 258483 | 9/1926 | United Kingdom . | |

*Primary Examiner*—A. Michael Chambers

*Attorney, Agent, or Firm*—Edwin E. Greigg; Ronald E. Greigg

[57] ABSTRACT

A novel valve, including a restoring spring which is pressed into a spring chamber opening and is held in the spring chamber opening by a radially oriented tension on one end of the spring; the depth to which the restoring spring is pressed determines the magnitude of the spring force acting upon the valve closing part. By dispensing with an adjusting sheath, not only is the danger of chip formation in the press-fitting operation lessened, but the production cost of the valve is reduced substantially as well. The valve is used as a fuel injection valve for fuel injection systems.

7 Claims, 3 Drawing Sheets

VALVE

BACKGROUND OF THE INVENTION

The invention is directed to improvements in valves for fuel injection systems of internal combustion engines. From German Patent Disclosure Document DE 38 31 196 A1, a valve is already known in which an adjusting sheath is forced into a spring chamber opening, and a restoring spring acting upon the valve closing part is supported on this sheath, the depth of insertion into the spring chamber opening determines the spring force of the restoring spring. When the adjusting sheath is pressed in, the danger exists that chips will be formed at the adjusting sheath and at the wall of the spring chamber opening, thereby soiling and possibly damaging the valve because of the metal chips.

OBJECT AND SUMMARY OF THE INVENTION

The valve according to the invention, has an advantage over the prior art that the adjusting sheath that serves to support and adjust the spring force of the restoring spring can be dispensed with. In this way, the danger of the development of chips as the adjusting sheath is pressed in is averted. Moreover, the production cost of the valve can be reduced considerably.

Because of the press fit of the restoring spring, rotation of the restoring spring about its longitudinal axis during valve operation is averted, and wear on the face end of the restoring spring toward the valve closing part and of the face end, for instance of a valve needle, resting on this spring face end is minimized.

It is especially advantageous if the restoring spring is embodied as a helical spring made from a spring steel wire, so that the restoring spring can be produced and installed in the spring chamber opening very simply and economically. By the self-locking of the restoring spring, embodied as a helical spring and press-fitted into the spring chamber opening, displacement of the restoring spring is effectively prevented, so that a spring force of the restoring spring that is constant during valve operation is assured. If the spring steel wire has a round cross section, then chip formation as the restoring spring is pressed into the spring chamber opening is especially effectively averted.

It is advantageous if the restoring spring has a radially inwardly pointing end of the spring steel wire, on an end remote from the valve needle. This kind of restoring spring can be installed in the spring chamber opening by rotation in the winding direction, under an axial pressure load; the outside diameter of the restoring spring is thereby constricted, which facilitates installation, without their being the danger of chip formation from the wire end contacting the wall of the spring chamber opening and moving relative to this opening in the circumferential direction.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
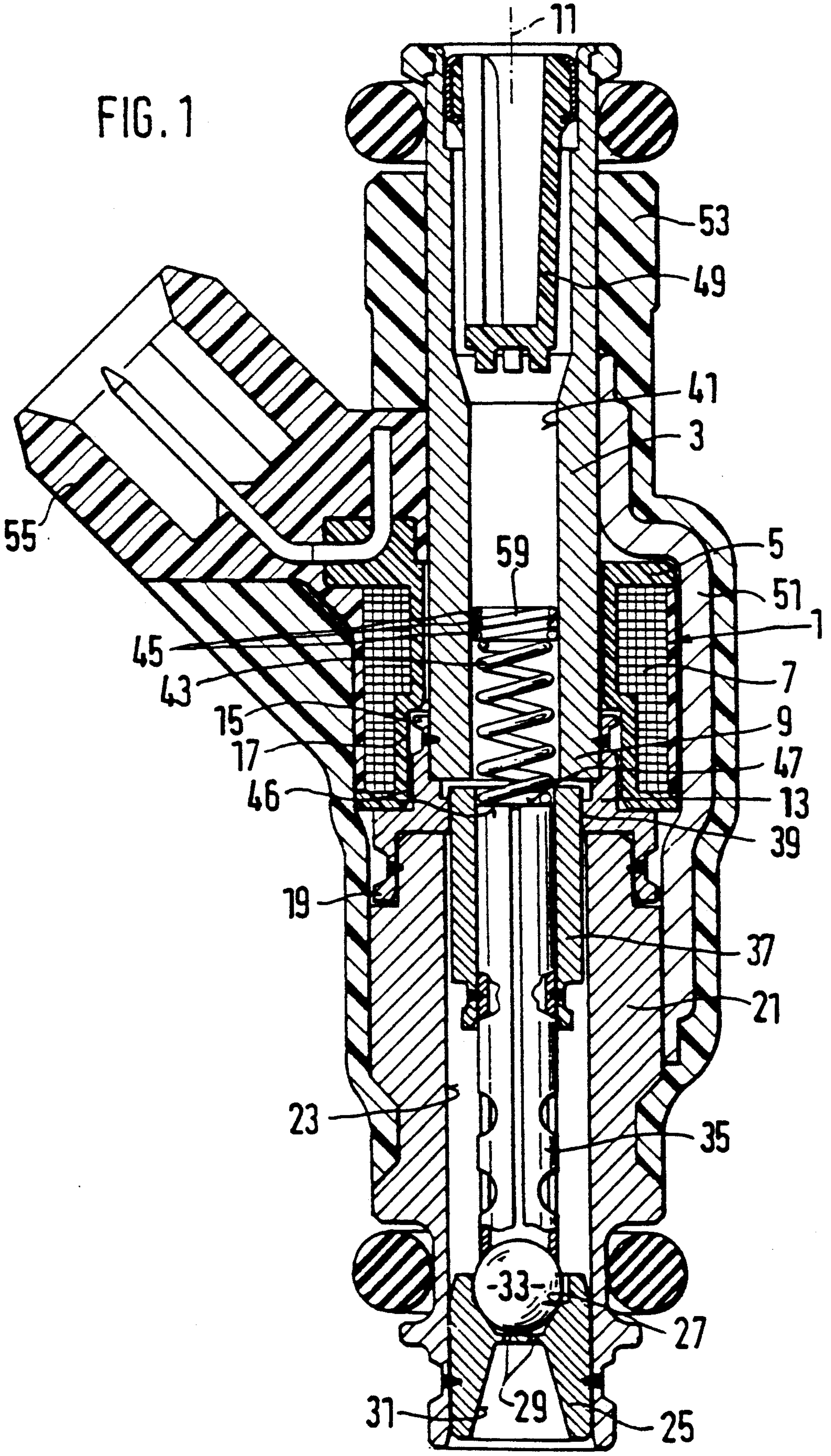
FIG. 1 shows a valve according to a first exemplary embodiment.

In FIG. 1 an electromagnetically actuatable fuel injection valve is shown, by way of example, for fuel injection systems in mixture-compressing internal combustion engines with externally supplied ignition. The fuel injection valve has a tubular inner pole 3 surrounded by a magnet coil 1 and acting as a fuel inlet neck. The magnet coil 1 has a radially stepped coil body 5, with a radially stepped winding 7, and in combination with the inner pole 3, which has a constant outside diameter, the magnet coil enables a particularly compact structure of the fuel injection valve.

A tubular intermediate part 13 is joined tightly, for instance by welding, to a lower pole end 9 of the inner pole 3, concentrically with a longitudinal valve axis 11, and as a result axially surrounds the pole end 9 partway, with an upwardly extending cylindrical segment 15. The stepped coil body 5 fits partway over the inner pole 3, and with a step 17 of larger diameter it fits partway over the upper cylindrical segment 15 of the intermediate part 13. On its end remote from the inner pole 3, the intermediate part 13 is provided with a lower cylindrical segment 19, which fits over a tubular nozzle holder 21, to which it is joined, for instance by welding. A cylindrical valve seat body 25 is installed tightly by welding in the downstream end of the nozzle holder 21, in a through opening 23 extending concentrically with the longitudinal valve axis 11. The valve seat body 25 has a fixed valve seat 27 oriented toward the magnet coil 1; injection ports 29, for instance two in number, are formed in the valve seat body 25 downstream of the valve seat 27. Downstream of the injection ports 29, a preparation bore 31, for example is formed in the valve seat body 25, widening frustoconically in the flow direction.

The fixed valve seat 27 cooperates with a valve closing part 33, which for instance is spherical, and which serves to open and close the valve. On its end remote from the fixed valve seat 27, the valve closing part 33 is joined to a tubular valve needle 35, for instance by welding. The valve needle is joined on its other end, remote from the valve closing part 33, to a tubular armature 37, for instance by welding. The armature 37 is guided on its circumference, for instance by a guide collar 39 of the intermediate part 13.

A restoring spring 43, which extends in the region of the pole end 9, for example, is press-fitted into a continuous stepped spring chamber opening 41 of the tubular inner pole 3. The opening 41 extends concentrically with the longitudinal valve axis 11 and serves to deliver the fuel toward the valve seat 27. The restoring spring 43 is for instance embodied as a helical spring, from a wire having a circular cross section, for example. The circular cross section of the wire hinders the development of chips on the restoring spring and on the wall of the spring chamber opening 41 as the restoring spring 43 is pressed in. The restoring spring 43 may for instance be made from a brass wire, spring steel wire, or some other arbitrary wire.

With holder windings 45, for instance 3 in number, formed on an end 59 remote from the valve closing part 33, these windings having an outer diameter larger than the diameter of the spring chamber opening 41, the restoring spring 43 rests against the wall of the spring chamber opening 41 with a radially effective tension. Because of the self locking of the holder windings 45 of the pressed-in restoring spring 43 embodied as a helical spring, this spring is retained in the spring chamber opening 41 without the danger that the restoring spring 43 will shift in the spring chamber opening 41 in the direction of the longitudinal valve axis 11.

By its face end 46 toward the fixed valve seat 27, the restoring spring 43 rests on a face end 47 of the valve needle 35 remote from the valve closing part 33, and it urges the valve closing part 33 in the direction of the fixed valve seat 27. The press-fit depth of the restoring spring 43 into the spring chamber opening 41 of the inner pole 3 determines the spring force of the restoring spring 43 and thus also affects the dynamic fuel quantity output during the opening and closing stroke of the valve.

The press fit of the restoring spring 43 into the spring chamber 41 of the inner pole 3, prevents rotation of the restoring spring 43 about its longitudinal axis during valve operation, thus minimizing wear and chip formation at the face end 47 of the valve needle 35 and at the face end 46 of the restoring spring 43 resting on the face end 47.

A fuel filter 49 is disposed in the stepped spring chamber opening 41 of the inner pole 3, upstream of the restoring spring 43 in the direction remote from the pole end 9. The magnet coil 1 is surrounded by at least one guide element 51, for instance embodied as a hoop and serving as a ferromagnetic element, which at least partially surrounds the magnet coil 1 circumferentially and rests by one end on the inner pole 3 and by its other end on the nozzle holder 21, to which it is connected, for instance by welding or soldering. Part of the fuel injection valve is encompassed by a plastic sheath 53, which extends axially, beginning at the inner pole 3, via the magnet coil 1 and the at least one guide element 51, and onto which an electric connection plug 55 is jointly injected.

Figure 2:
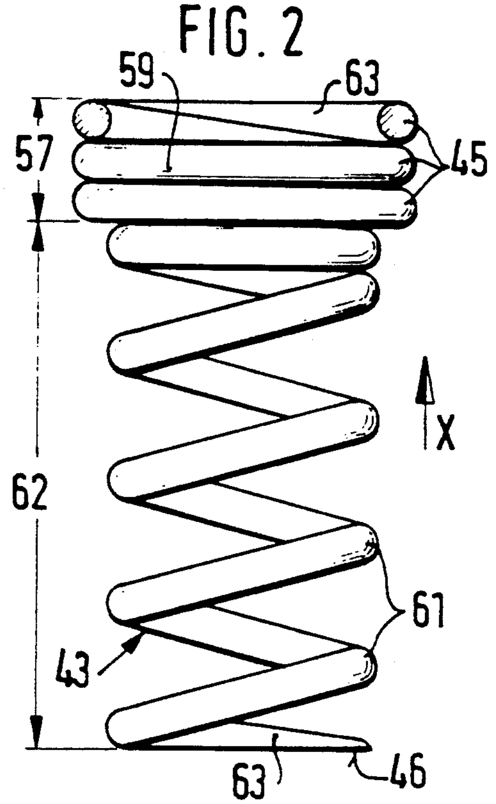
FIG. 2 shows a restoring spring in the first exemplary embodiment.
Figure 3:
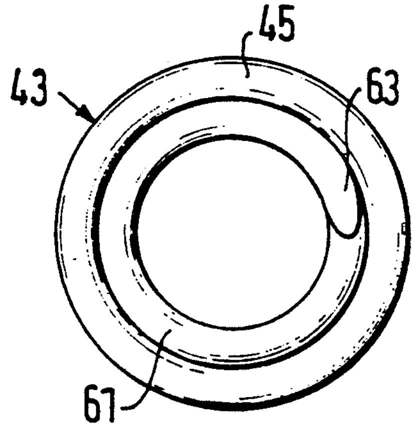
FIG. 3 is a view of the restoring spring of the first exemplary embodiment in a direction of the arrow X in FIG. 2.

The restoring spring 43 in the first exemplary embodiment, shown in FIG. 1, is shown in FIGS. 2 and 3; FIG. 3 is a view of the restoring spring in the direction of the arrow X in FIG. 2. On its end 59 remote from its face end 46, the restoring spring 43 has holder windings 45, for instance three in number, which have an outer diameter larger than the diameter of the spring chamber opening 41 of the inner pole 3 and form a cylindrical clamping region 57. As a result of the press fit of the restoring spring 43 into the spring chamber opening 41, the restoring spring is securely held by the tension acting in the radial direction between the holder windings 45 or the cylindrical clamping region 57 and the wall of the spring chamber opening 41, without there being any danger of shifting of the restoring spring 43 in the direction of the longitudinal valve axis 11. The holder windings 45 are adjoined by active spring windings 61, toward the face end 46 of the restoring spring 43. If, as shown in FIG. 1, the restoring spring 43 is installed in a valve, then its active spring windings 61 exert a spring force upon the valve closing part 33 in the direction of the valve seat 27. The spring windings 61 have a outer diameter smaller than the diameter of the spring chamber opening 41 of the inner pole 3 and form a cylindrical active spring region 62. The wire segment has one wire end 63 on each of the two ends of the restoring spring 43; this end 63 is bent in the circumferential direction and ground down at least on the end 46 of the spring, resulting in a flat face end 46 of the spring.

Figure 4:
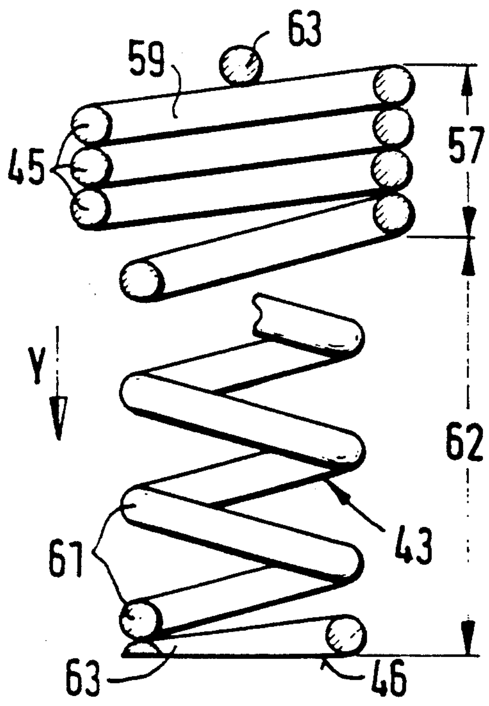
FIG. 4 shows a restoring spring in a second exemplary embodiment of the invention.
Figure 5:
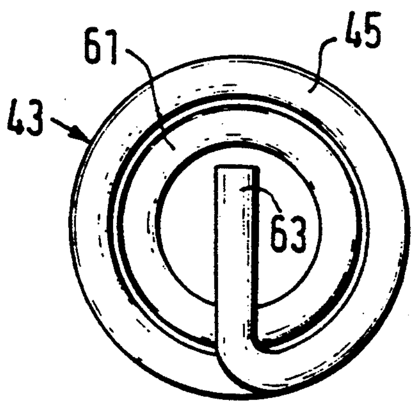
FIG. 5 is a view of the restoring spring of the second exemplary embodiment in the direction of the arrow Y in FIG. 4.

A restoring spring in accordance with a second exemplary embodiment of the invention is shown in FIGS. 4 and 5, with FIG. 5 being a view of the restoring spring 43 in the direction of the arrow Y in FIG. 4. As in the first exemplary embodiment, the restoring spring 43, embodied from a wire segment, has holder windings 45, for instance three in number, on its end 59, which have an outer diameter larger than the diameter of the spring chamber opening 41 and together form a cylindrical clamping region 57. The holder windings 45 are adjoined, toward the face end 46 of the spring, by active spring windings 61, which have an outer diameter smaller than the diameter of the spring chamber opening 41 and form an active cylindrical spring region 62. In contrast to the restoring spring of the first exemplary embodiment, the restoring spring 43 of the second exemplary embodiment has a different winding direction, it has a wire end 63 pointing radially inward and on its end 59 remote from the face end 46 of the spring. This inwardly pointing wire end 63 makes it possible to thrust the restoring spring 43 into the spring chamber opening 41 by turning it in the direction of winding about its own axis, in the course of which a force in the direction toward the valve needle 35 is brought to bear. In this process, the outer diameter of the holder windings 45 is constricted, making it easier to install the restoring spring 43 in the spring chamber opening 41 of the inner pole 3. Because of the inwardly pointing wire end 63, the danger of chip formation from a wire end contacting the wall of the spring chamber opening 41 and moving relative to the wall circumferentially during installation is averted.

Figure 6:
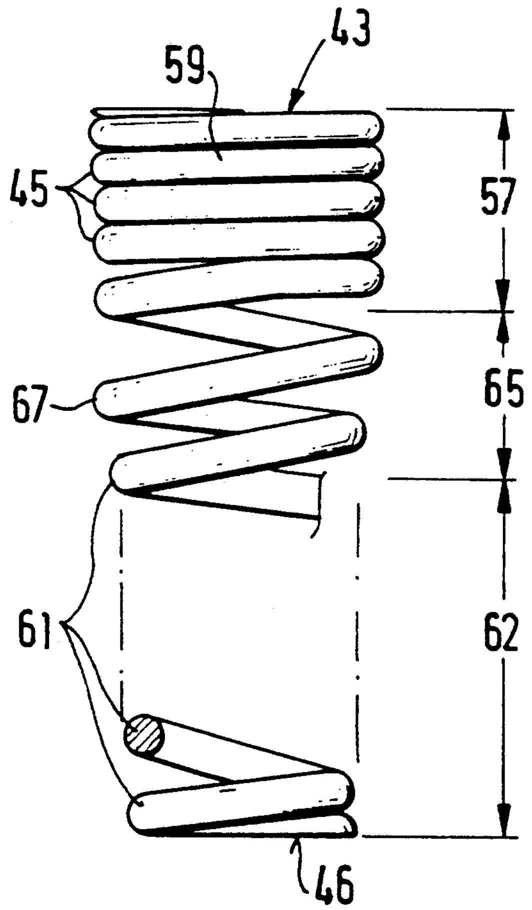
FIG. 6 shows a restoring spring in a third exemplary embodiment of the invention.

FIG. 6 shows a restoring spring 43 in accordance with a third exemplary embodiment of the invention. On its end 59, the restoring spring 43, which for instance takes the form of a helical spring made of wire, has holder windings 45, for instance five of them, which have an outer diameter larger than the diameter of the spring chamber opening 41 of the inner pole 3 and which together form a cylindrical clamping region 57, with which the restoring spring 43 is held by a press fit in the spring chamber opening 41 of a valve. Toward the face end 46 of the spring, the restoring spring 43 has a plurality of active spring windings 61, which form a cylindrical active spring region 62, whose outside diameter is smaller than the diameter of the spring chamber opening 41. A conically extending transition region 65 with transition windings 67 is provided between the cylindrical clamping region 57 and the active cylindrical spring region 62. If the restoring spring 43 is installed in a valve shown by way of example in FIG. 1, then the active spring windings 61, together with the transition windings 67, exert a spring force oriented in the direction of the valve seat 27 upon the valve needle 35 and thus upon the valve closing part 33.

The restoring spring 43, pressed into the spring chamber opening 41 of the valve, makes it possible to dispense with the adjusting sheath and thus enables lowering the production cost of the valve. Moreover, the danger of chip formation in the press fitting operation is avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A valve for fuel injection systems of internal combustion engines, having a valve closing part that cooperates with a valve seat, and having a restoring spring disposed in a spring chamber opening that urges the valve closing part in the direction of the valve seat, in which in an unassembled state the restoring spring (43) has at least in one region, a larger diameter than the spring chamber openings (41) and is press-fitted into the spring chamber opening (41) in such a manner that the restoring spring (43) is held in the spring chamber opening (41) in a radially and an axial direction only by radially oriented tension.

2. A valve as defined by claim 1, in which the restoring spring (43) is embodied as a helical spring from a spring steel wire.

3. A valve as defined by claim 2, in which the restoring spring (43), toward the valve closing part (33), has an active spring region (62) with a smaller diameter than the spring chamber opening (41) and, remote from the valve closing part (33), a cylindrical clamping region (57) with a larger diameter than the spring chamber opening (41).

4. A valve as defined by claim 3, in which the restoring spring (43) has a conically extending transition region (65), between the spring region (62) and the cylindrical clamping region (57).

5. A valve as defined by claim 2, in which the restoring spring (43), on an end (59) remote from the valve needle (35), has a wire end (53), pointing radially inward, of the spring steel wire.

6. A valve as defined by claim 3, in which the restoring spring (43), on an end (59) remote from the valve needle (35), has a wire end (53), pointing radially inward, of the spring steel wire.

7. A valve as defined by claim 4, in which the restoring spring (43), on an end (59) remote from the valve needle (35), has a wire end (53), pointing radially inward, of the spring steel wire.

* * * * *